United States Patent [19]

Gannon

[11] Patent Number: 5,316,101

[45] Date of Patent: May 31, 1994

[54] ELECTRIC AND PEDAL DRIVEN BICYCLE WITH SOLAR CHARGING

[76] Inventor: Henry M. Gannon, 2026 10th St., Boulder, Colo. 80302

[21] Appl. No.: 55,216

[22] Filed: Apr. 29, 1993

Related U.S. Application Data

[62] Division of Ser. No. 716,089, Jun. 17, 1991, Pat. No. 5,237,263.

[51] Int. Cl.$^5$ .............................................. B62K 11/00
[52] U.S. Cl. ..................................... 180/221; 180/2.2; 180/220
[58] Field of Search .................. 180/2.2, 211, 220, 222

[56] References Cited

U.S. PATENT DOCUMENTS

| 3,431,994 | 3/1969 | Wood, Jr. | 180/221 X |
| 3,891,044 | 6/1975 | Tiede | 180/222 |
| 3,921,745 | 11/1975 | McCulloch et al. | 180/220 X |
| 4,418,784 | 12/1983 | Fox | 180/221 |
| 4,516,647 | 5/1985 | Novak | 180/2.2 |
| 4,871,042 | 10/1989 | Hsu et al. | 180/220 |
| 5,226,501 | 7/1993 | Takata | 180/220 X |

FOREIGN PATENT DOCUMENTS

49110  10/1991  Fed. Rep. of Germany ....... 180/2.2

Primary Examiner—Margaret A. Focarino
Assistant Examiner—Carla Mattix

[57] ABSTRACT

The invention relates to an electric propulsion system for a multi-wheeled vehicle including though not limited to a bicycle. The preferred embodiment consists of a standard street bicycle with multi-speed transmission, plus an electrical propulsion system and a solar charging apparatus. This preferred embodiment is normally powered by a combination of motor and pedals, coupled such that either or both may provide power at any time. The electrical propulsion system consists of: a) a DC electric motor, B) a plurality of batteries, C) a hand lever operating a throttle means, D) a throttle means which controls a battery switching circuit for altering the plurality of batteries into a parallel configuration for a lower voltage to facilitate regenerative charging at times, and into a series configuration at other times for a higher drive voltage for the motor, as well as controls a voltage regulating circuit which regulates voltage to the motor, E) a continuously variable automatic transmission which selects the correct ratio for conditions between a high and a low limit without intervention by the operator, as well as automatically regulates clutching friction, and F) A regenerative braking arrangement which converts forward momentum of bicycle and rider into a charging current for the plurality of batteries during braking or slowing. The solar apparatus consists of a plurality of solar cells mounted on a disc fitted outside the spokes on either or both sides of either or both wheels. A rotatable coupler conducts the solar charging current from the solar cells to the plurality of batteries.

7 Claims, 5 Drawing Sheets

ELECTRIC AND PEDAL DRIVEN BICYCLE WITH SOLAR CHARGING

This is a division of application Ser. No. 07/716,089 filed Jun. 17, 1991, now issued as U.S. Pat. No. 5,237,263.

BACKGROUND OF THE INVENTION

This invention relates to an electric propulsion system for a multi-wheeled vehicle including but not limited to a bicycle. Electric powered vehicles are inherently cleaner and quieter than their gasoline and diesel powered counterparts, with no warm-up and potentially less maintenance required.

Electric powered bicycles are well known in the art at least as far back as the Humber electric bicycle of 1898. There have been many variations over the vows including the patents of Rudwic (U.S. Pat. No. 4,280,581), Havener et al (U.S. Pat. No. 3,966,007), and McCulloch et al (U.S. Pat. No. 3,921,745).

Standard components of a typical electric bicycle include a bicycle, a conventional lead-acid battery, a DC electric motor, drive means for mechanically connecting the motor with a front or rear wheel, and a throttle means for electrically connecting the battery with the motor. There is invariably a provision whereby pedal and motor power may be provided in combination to add range between recharges and improve speed and hill climbing ability. There is sometimes a regenerative braking arrangement such that the motor acts as a generator when slowing or stopping to convert the forward momentum of the bicycle and rider into a charging current to restore energy to the battery.

Many difficulties and optimization problems have been noted in prior art. One of the major problems is that a conventional lead-acid battery stores only a small fraction of the energy contained in an equal weight of gasoline or diesel fuel. Although nickel-cadmium and other types of alternate battery offer improved energy density, capacity has not yet approached that of gasoline or diesel fuel and cost may be prohibitive.

A related problem is that an electric propulsion system invariably interferes with the normal pedaling and handling of a bicycle. Increasing the size of the battery from some base size likely increases range between recharges, but further hampers pedaling and handling. Speed and hill climbing ability may also be negatively affected. Decreasing the size of the battery from some base size likely improves pedaling and handling, though decreases range between recharges and may affect speed.

The DC permanent magnet motor has been widely referenced as a powerful, efficient, yet low cost option. One disadvantage is that frequent ratio changes are needed to stay within the 1,500 to 3,000 RPM window of highest power and efficiency of this motor, and simultaneous changing ratios for both motor and pedals is too difficult for most operators. The single ratio used in most prior art compromises either speed or hill-climbing ability to an unacceptable extent, and a simple yet highly efficient automatic transmission is lacking.

An electric motor of about 1/10 horsepower providing a top speed of about 11-14 mph on level ground has been cited as optimum. One reason for this selection is that air resistance against a bicycle and rider increase rapidly above about 12 mph, and efficiency likewise diminishes. Another reason is that by having power parity with the unmotored bicycle (the average rider also generates about 1/10 horsepower with normal pedaling), the electrical bicycle can be used over normal bicycle routes and otherwise function as a conventional bicycle.

Regenerative breaking can extend the range of the electric bicycle between recharges by a significant amount. However, a relatively high motor RPM is generally needed to overcome the terminal voltage of the battery before charging can begin. For example, if a 12 volt permanent magnet motor and a 12-volt battery are used under a ratio suitable for level ground, there would be little charging (or braking) at speeds below about 8 mph, and the variable braking action for a slow or rapid decrease in speed would be lacking. These problems have been partially solved in prior art through a variety of devices, though progress seems to have come at the expense of complexity.

Where a friction clutch is used, an increase in efficiency and a decrease in premature wear is gained if a clutching force proportional to the load applied can be provided. A relatively high amount of friction is needed on first starting, a medium amount when crossing level ground, and a low amount when going down hill, whereas a spring type clutch provides a constant clutching force regardless of conditions.

One clutching solution noted in prior art entails mounting a motor and drive roller on a hinged or slidable frame. As the drive roller swings or slides into contact with the driven tire, the opposing rotation between drive roller and driven tire produces a "gripping" action proportional to load applied. One serious flaw is that only a single ratio between the motor and the driven wheel is realized.

Better handling and increased safety result if the motor can be throttled for a variety of power levels. The throttle means of most prior art, whereby the motor is switched between ON and OFF, is very suboptimal in this regard. Another throttle means of prior art, which causes a plurality of batteries to be switched into parallel or series combinations for at least two discrete voltage levels, with the lower voltage level also useful in regenerative braking, offers some improvement over direct switching. The rheostat or dropping resistors of other yet other prior art offers additional or even continuous voltage levels, though dissipates an unacceptable amount of power into heat.

The throttle means of still other prior art, which incorporates a DC to DC converter to regulate voltage to the motor through varying the duty cycle of the applied battery voltage, provides a continuously variable voltage level at improved efficiency over a rheostat or dropping resistors. However, full battery voltage is never delivered at full throttle because of the presence of an inline semiconductor, complexity is relatively high, and efficiency remains decidedly below that of direct switching.

In summary, designing a practical electric propulsion system for a bicycle has proven to be a formidable task. As evidenced by the absence or rarity of electric powered bicycles in commercial production at this time, an electric bicycle which effectively competes against other forms of transportation remains lacking.

SUMMARY OF THE INVENTION

Electric and Pedal-Driven Bicycle With Solar Charging

Accordingly, it is the primary object of the present invention to overcome said problems and inefficiencies and provide a practical electric propulsion system with solar charging for a vehicle including though not limited to a bicycle. This propulsion system overcomes limitations of prior art through optimization of standard components and incorporation of practical and novel concepts, and thereby allows the rider to travel further and faster and with fewer complications.

A more specific object of the present invention is to incorporate devices which reduce the size and weight of the electric battery needed for a bicycle and rider to cover a given distance over the course of a day. One way this objective is accomplished is through a novel regenerative braking arrangement, which operates more effectively and at lower speeds than is possible with current art, is variable for more or less braking action, and effective to the extent that the need for a conventional rear friction brake is eliminated.

Another way this object is accomplished is by novel solar cell arrangement which recharges the batteries during daylight hours. Since a bicycle is ordinarily used for a number of excursions over the course of a day covering a few miles at a time, left idle for the remainder of the day, and ridden only in clear weather, charging time while parked is sufficient to replenish energy to a major extent.

Another of the present invention's objects is to position the components of the electrical propulsion system so as to arrive at optimal weight distribution and highest convenience to the operator. One way this objective is met is by mounting the plurality of batteries used in this design so as to provide an optimum center of gravity and to minimize interference with peddling and maneuvering.

Still another of the present invention's objects is to provide a novel continuously variable automatic transmission capable of varying in ratio between an upper and a lower limit without the need for operator intervention. The overall ratio between the upper and lower limits of this transmission is about 2.30:1, weigh is only a few pounds, and ruggedness is sufficiently for high dependability. This transmission also automatically regulates clutching friction.

Yet another object of the present invention is to provide a throttle means incorporating a battery switching circuit and a novel variable voltage circuit. This battery switching circuit connects the plurality of batteries into electrical parallel at times for a lower terminal voltage for more effective charging when regeneratively braking, and into electrical series at other times for a higher terminal voltage ("raw" drive voltage) for driving the motor. The variable voltage circuit then precisely regulates the raw drive voltage to the motor with no loss of battery voltage at full throttle, and with a conversion efficiency in the range of 90 percent.

BRIEF DESCRIPTION OF THE DRAWINGS

FIG. 2 also shows how the motor and transmission are coupled with gear sprockets, a chain, and a chain tensioner.

DETAILED DESCRIPTION OF THE PREFERRED EMBODIMENT

Figure 1:
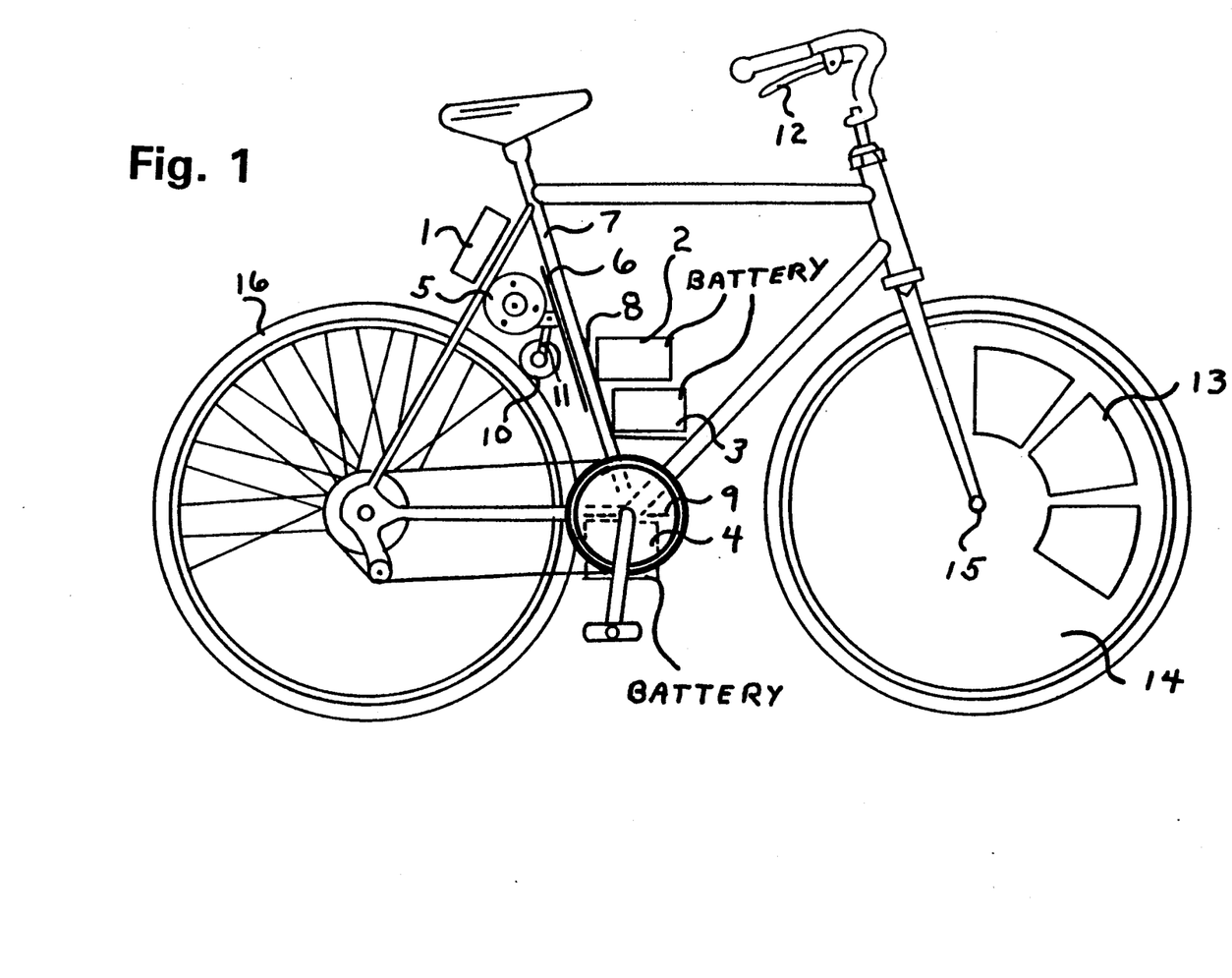
FIG. 1 is an overall pictorial view of the right side of a bicycle constructed in accordance with the present invention.

In reference to FIG. 1, Batteries 2, 3, and 4 comprise 6-volt batteries of the permanently sealed type so as to prevent leakage no matter how the bicycle may be tilted. The 2½-inch depth of batteries 2, 3, and 4 allows each to be installed endwise for minimal interference with peddling. In this preferred embodiment, batteries 2, 3, and 4 are secured in battery frames 8 and 9 such that their combined center of mass is in the vicinity of battery 3, thereby offsetting the inertia of battery 2 with that of battery 4 as the bicycle is tuned during operation.

Circuit box 1 contains the battery switching circuit, the variable voltage circuit, and the mechanical throttle control of the throttle means. One input to circuit box 1 is a throttle cable, similar to or the same as the type used for a bicycle brake cable. The throttle lever which operates this throttle cable is mounted on the left side of the handlebars, such that the operator can apply the throttle with the left hand thereby leaving the right hand free for changing pedal gears.

Another input to circuit box 1 are conductive cables from each pole of 6-volt batteries 2, 3, 4 (six cables in total) for use by the battery switching circuit. Battery combinations realized in this preferred embodiment are 6-volts when in parallel, and 18-volt when in series. The output of circuit box 1 is a positive and negative power cable going to motor 5. Motor 5, which is securely fastened to mounting frame 6 with "U" bolts, provides about 1/10 horsepower of output power. Mounting frame 6 is bolted to bicycle downtube 7.

Drive cone 10 clutches against tire 16 for ratio reduction and regenerative braking. Using tire 16 for these purposes reduces parts count, complexity, and weight of the present invention. Regenerative braking is initiated as the operator actuates brake lever 12. The pull on this lever through a cable rotates lever 1 1, thereby forcing drive cone 10 firmly against tire 16 to prevent freewheeling and couple torque from the revolving wheel to motor 5.

Solar charging is provided by plurality of solar cells 13. Each unit of plurality of solar cells 13 contains multiple individual solar cells such that about 7 volts of open circuit voltage is provided in direct sunlight for charging the plurality of batteries through a blocking diode. This unit configuration maximizes charge in uneven light, whereas if all solar cells in the plurality of solar cells 13 were connected in series and light to one or more cells were to be disrupted, little charging would take place. Plurality of solar cells 13 provided on each disc can contribute energy at the rate of about 25 watts in full sunlight.

Plurality of solar cells 13 are mounted on disc 14, a disc which may be of the type commonly used to reduce friction between the spokes and the surrounding air as the wheel rotates. In this preferred embodiment disc 14 is rigidly attached to and outside of the spokes, though disc 14 might also function as the spokes in supporting the weight of the bicycle and rider in some embodiments.

Disc 14 with plurality Of solar cells 13 mounted thereon may be attached on either or both sides of either or both wheels. Rotating ring and stationary brush arrangement 15 electrically connects plurality of solar cells 13 with batteries 2, 3, and 4 for charging, while at the same time allows the wheel (s) to rotate freely.

Figure 2:
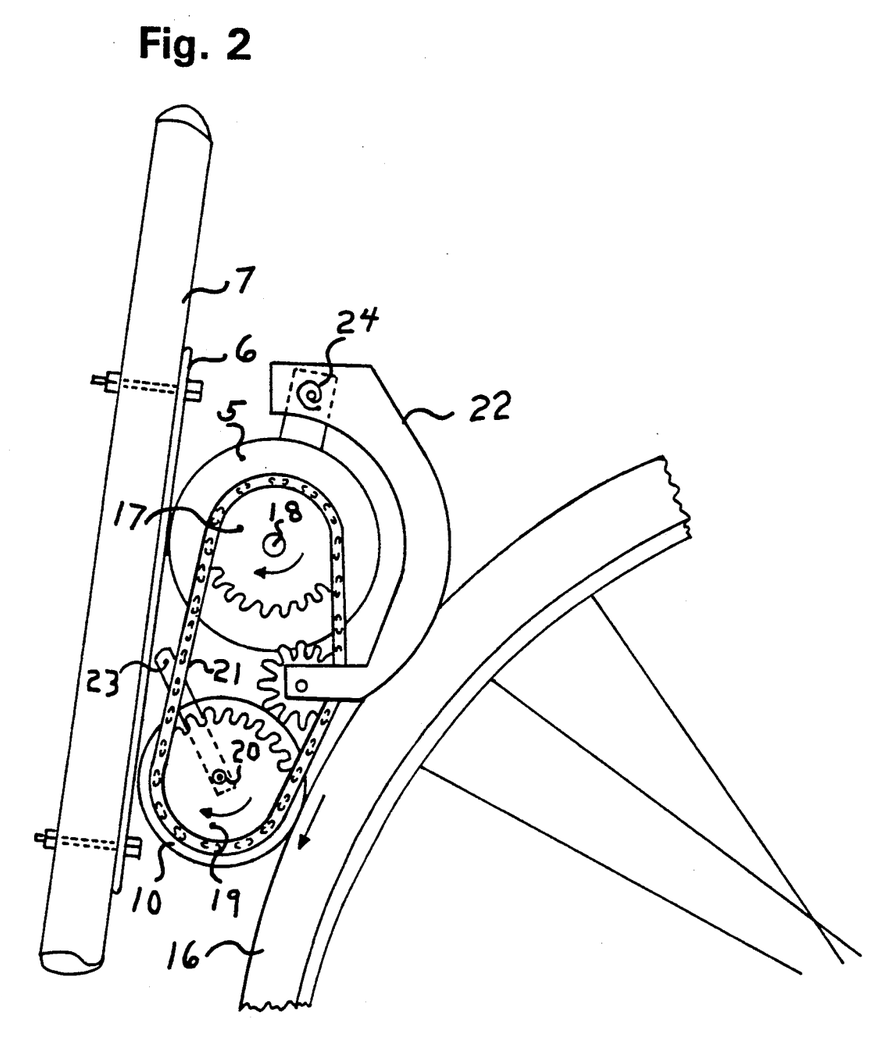
FIG. 2 is a pictorial side view of the left side of the bicycle showing the motor and transmission of FIG. 1 as they are attached to the downtube of the bicycle.

FIG. 2 shows how motor 5 and the transmission of FIG I are attached to mounting frame 6 and to bicycle downtube 7 as viewed from the left side of the bicycle. Gear sprocket 17 is fitted to motor shaft 18, while gear sprocket 19 is fitted to spirally fluted transmission drive shaft 20, for a 1:1 gear ratio in this preferred embodiment. Drive chain 21 interconnects gear sprocket 17 with gear sprocket 19. Gear sprockets 17 and 19 normally rotate CW as viewed from this orientation, while tire 16 normally rotates CCW.

Chain tensioner 22 both removes unwanted slack from drive chain 21, and urges drive cone 10 pivoting on swing axle 23 against tire 16, such that the outer periphery of drive cone 10 is in a constant frictional contact with the outer periphery of tire 16. Coil spring 24 provides force to urge chain tensioner 22 outwards and away from bicycle downtube 7.

Figure 3:
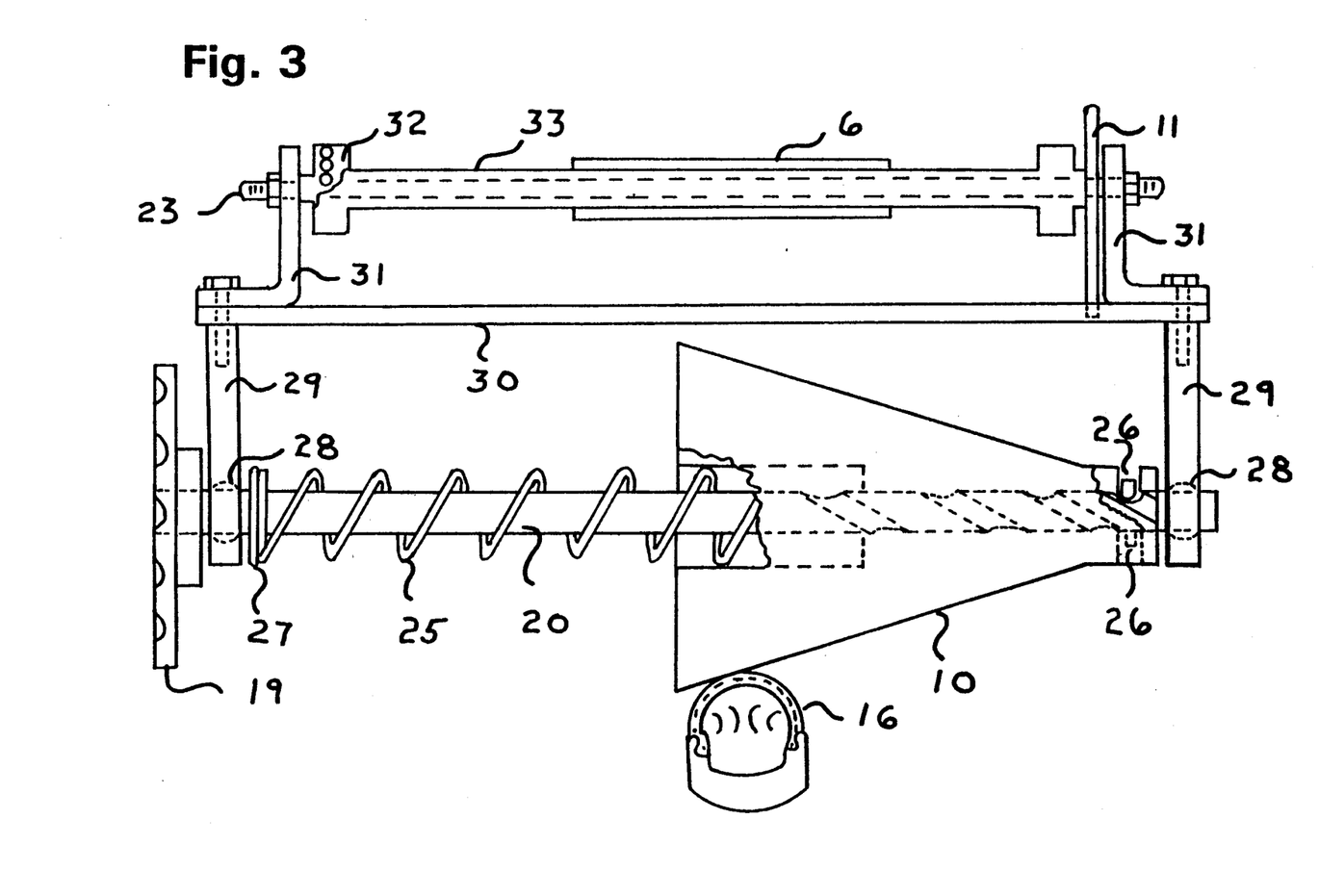
FIG. 3 is a sectional view as seen from above and behind the continuously variable automatic transmission employed in the bicycle of FIG. 1. Included in FIG. 3 are the drive cone, spirally fluted drive shaft, return spring, swing axle, and associated hardware.

FIG. 3 is a sectional view of the continuously variable automatic transmission such as might be seen from a rear luggage rack vantage point with motor 5 removed for unobscured viewing. Drive cone 10 is machined from solid metal stock for a diameter of 1¾-inches at the large end, and ¾-inches at the small end, for an overall ratio of about 2.3:1. The slope at the small end levels off to a ½-inch wide step (as shown) for improved performance under high friction conditions.

A 5/16-inch hole bored longitudinally through drive cone 10 allows spirally fluted drive shaft 20 to be inserted, while a 1-inch recess in the large end of drive cone 10 allows a relatively long spring with a more linear compression tension to be used for return spring 25. The opposite end of return spring 25 is abutted to keeper 27, which is in turn fastened to spirally fluted drive shaft 20.

Two ¼-inch holes are bored and threaded on opposite sides of drive cone 10 within the ½-inch wide step of drive cone 10 as shown. Threaded set screws 26 are tuned into the threaded holes such that the tip of each set screw extrudes into a recess formed by the spirally fluted channels of spirally fluted drive shaft 20. These fluted channels complete about three and one-half complete revolutions over their length. As drive cone 10 slides to the left and right along spirally fluted drive shaft 20, set screws 26 impart a rotating motion as they track inside the spirally fluted channels.

The transmission frame, which supports drive cone 10, spirally fluted drive shaft 20, return spring 25, and associated hardware, consists of bearing arms 29, crossmember 30, and brackets 31. Spirally fluted drive shaft 20 revolves in circular bearings 28, which serve to make alignment of spirally fluted drive shaft 20 within this transmission frame less critical. Swing axle 23 allows the transmission frame to swing toward and away from tire 16. Swing axle 23 rotates on ball bearings 32 contained within housing 33. Housing 33 is securely attached to mounting frame 6 with "U" bolts.

Lever 11 is essentially a cable-operated lever which, when activated, levers the transmission frame on swing axle 23 toward tire 16 for the purpose of increasing friction between drive cone 10 and tire 16 for regenerative braking. Drive sprocket 19 is fitted to spirally fluted drive shaft 20.

In operation, as drive cone 10 slides/rotates to the left, a smaller diameter along its outer perimeter contacts an outer perimeter of fire 16 and consequently a lower ratio with the driven wheel results. As drive cone 10 slides/rotates to the right, a larger diameter along its outer perimeter contacts an outer perimeter of tire 16 and consequently a higher ratio with the driven wheel results. With the 27-inch wheel used in this preferred embodiment, a highest ratio of about 1:15 is realized as the large diameter end of drive cone 10 contacts tire 16, while a lowest ratio of about 1:36 is realized as the small diameter end of drive cone 10 contacts tire 16.

Drive cone 10 could be modified in a number of ways while staying within the intent of this disclosure. For example, drive cone 10 could have a linear overall slope of about 4:1 along its outer perimeter, a logarithmic slope, a "stepped" slope, etc.

As motor 5 turns spirally fluted drive shaft 20 through drive sprocket 19, drive cone 10 positions to the left and right along spirally fluted drive shaft 20 to provide the correct ratio between the shaft of motor 5 and the driven wheel. Positioning of drive cone 10 is achieved as a compromise between torque provided by motor 5, which attempts to draw drive cone 10 along the spirally fluted channels to the left and into lower ratios, and pressure provided by return spring 25, which continuously urges drive cone 10 to the right and into higher ratios.

Upon first starting, high torque from motor 5 overpowers the urging force of return spring 25 and draws drive cone 10 to the left into lowest ratio. As motor 5 progressively comes up to about 1,500 RPM, the urging force of return spring 25 partially overcomes the medium torque from motor 5 and pushes drive cone 10 to the right and into mid-ratio. As motor 5 progressively comes up to about 3,000 RPM, the urging force from return spring 25 overpowers the low torque produced by motor 5 and pushes drive cone 10 to the far right and into highest ratio.

The correct amount of friction between the perimeter of drive cone 10 and the perimeter of tire 16 is also automatically adjusted as drive cone 10 moves to the left and right along spirally fluted drive shaft 20. On first starting from a dead stop and with drive cone 10 moving into leftmost position, the transmission frame swings toward tire 16 into near right angle orientation. Friction is high in this orientation owing to a high level of "gripping" caused by the opposite rotation of drive cone 10 and tire 16. Drive cone 10 would actually turn over tire 16 except for the presence of a built-in stop. The flat step machined into the small diameter end of drive cone 10 provides a more even surface to improve performance under these high friction conditions.

As drive cone 10 moves into in mid-position, the transmission frame progressively swings away from tire 16 into medium angle orientation. Friction is medium in this orientation, and results from a combination of gripping caused by the opposite rotation of drive cone 10 and tire 16, and pressure provided by chain tensioner 22. As drive cone 10 moves to the far right, the transmission frame progressively swings still farther away from tire 16 into low angle orientation. Friction is low in this orientation, and results mainly from the pressure provided by chain tensioner 22.

As the operator releases the throttle, virtual freewheeling results as torque now provided by tire 16 counteracts most of the friction provided by chain tensioner 22, such that friction between drive cone 10 and tire 16 is very low. A mechanism might also be incorporated to lift drive cone 10 off tire 16 for optimum freewheeling.

As the operator squeezes brake lever 12 to slow or stop the bicycle, lever 11 presses drive cone 10 firmly against tire 16. Freewheeling ceases as tire 16 frictionally couples to motor 5 through drive cone 10. As the operator squeezes brake lever 12 yet more firmly, drive cone 10 is pressed to the left on spirally fluted drive shaft 20 such that a smaller perimeter of drive cone 10 contacts tire 16, and braking action increases. A positive movement device to press drive cone 10 to the left and into lower ratios with the wheel might also be incorporated into the design.

Figure 4:
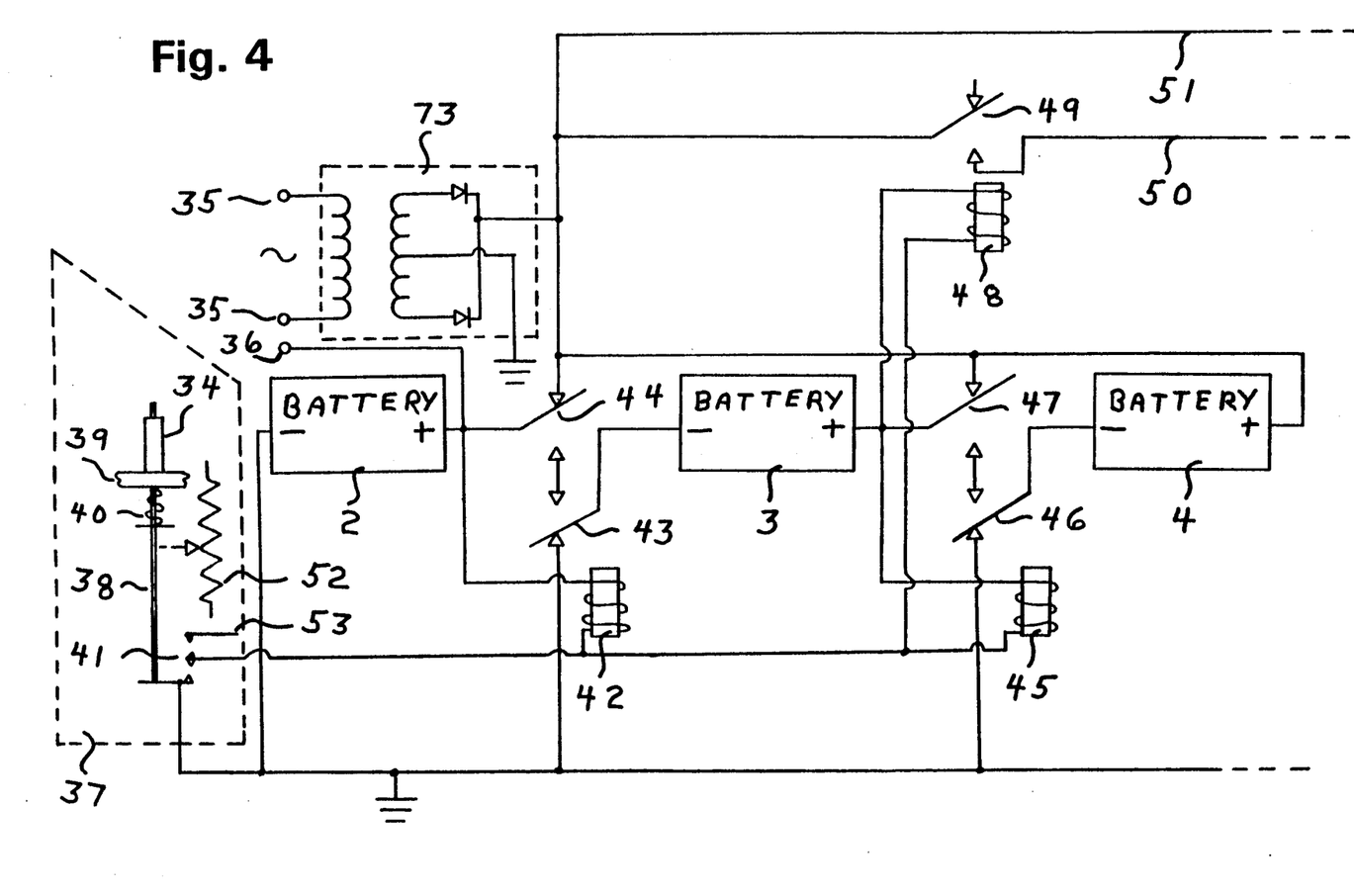
FIG. 4 is a pictorial schematic diagram of the battery switching portion of the throttle means employed in the bicycle of FIG. 1, showing the electrical positioning of batteries and relays, the locations for recharging the batteries, and the mechanical throttle control mechanism.

As depicted in FIG. 4, which shows the battery switching portion of the throttle means, batteries 2, 3, and 4 can be charged by built-in (or external) battery charger 23, with ac input voltage applied across points 35. Batteries 2, 3, and 4 should be configured in parallel as this charging occurs. The output of each unit of the plurality of solar cells 13 is applied between point 36 and ground, and charging is possible whether batteries are configured in series or parallel. If in series, any possible imbalance in charge between batteries 2, 3, and 4 that might accumulate is equalized as batteries 2, 3, and 4 are once again configured in parallel.

Throttle mechanism 37 initiates action in both the battery switching circuit and the variable voltage circuit. With throttle mechanism 37 completely closed, batteries 2, 3, and 4 are paralleled such that each positive pole is connected with all positive poles, and each negative pole is connected with all negative poles. The 6-volt terminal voltage which results allows charging current to more easily flow from motor 5 when regeneratively braking.

As the operator first opens throttle mechanism 37, batteries 2, 3, and 4 are connected into series such that the 18-volt raw drive voltage appears on conductor 50 as follows: Throttle cable 38 abutted to stationary point of bicycle frame 39 shortens while pulling against return spring 40. Electrical contact 41 is grounded thereby grounding relays 42, 45, and 48. As 6-volt dual-pole, dual-throw relay 42 changes state, its center taps 43 and 44 connect the positive pole of battery 2 with the negative pole of battery 3, and 12-volts is thus seen at the positive pole of battery 3.

As 12-volt dual-pole, dual throw relay 45 changes state, its center taps 46 and 47 connect the positive pole of battery 3 with the negative pole of battery 4, and 18-volts is thus seen at the positive pole of battery 4.

As 12-volt single-pole, single-throw relay 48 changes state, its center tap 49 makes the 18-volt raw drive voltage available to conductor 50. Delicate circuitry is thus protected from aberrant voltages that may be present during regenerative braking, and the possibility of leakage through motor 5 when the circuit is idle is eliminated. Regenerative charging currents are routed through conductor 51.

As the operator further opens throttle mechanism 37, the ohmic value between either end of the resistive portion of potentiometer 52 and the wiper is altered, though the sum of the resistances remains the same. As the operator opens throttle mechanism 37 still further, contact 53 is grounded. As will be shown in FIG. 5, the shifting resistance values between either end of potentiometer 52 and the wiper and the grounding of contact 53 cause an increased voltage level to be applied to motor 5.

Figure 5:
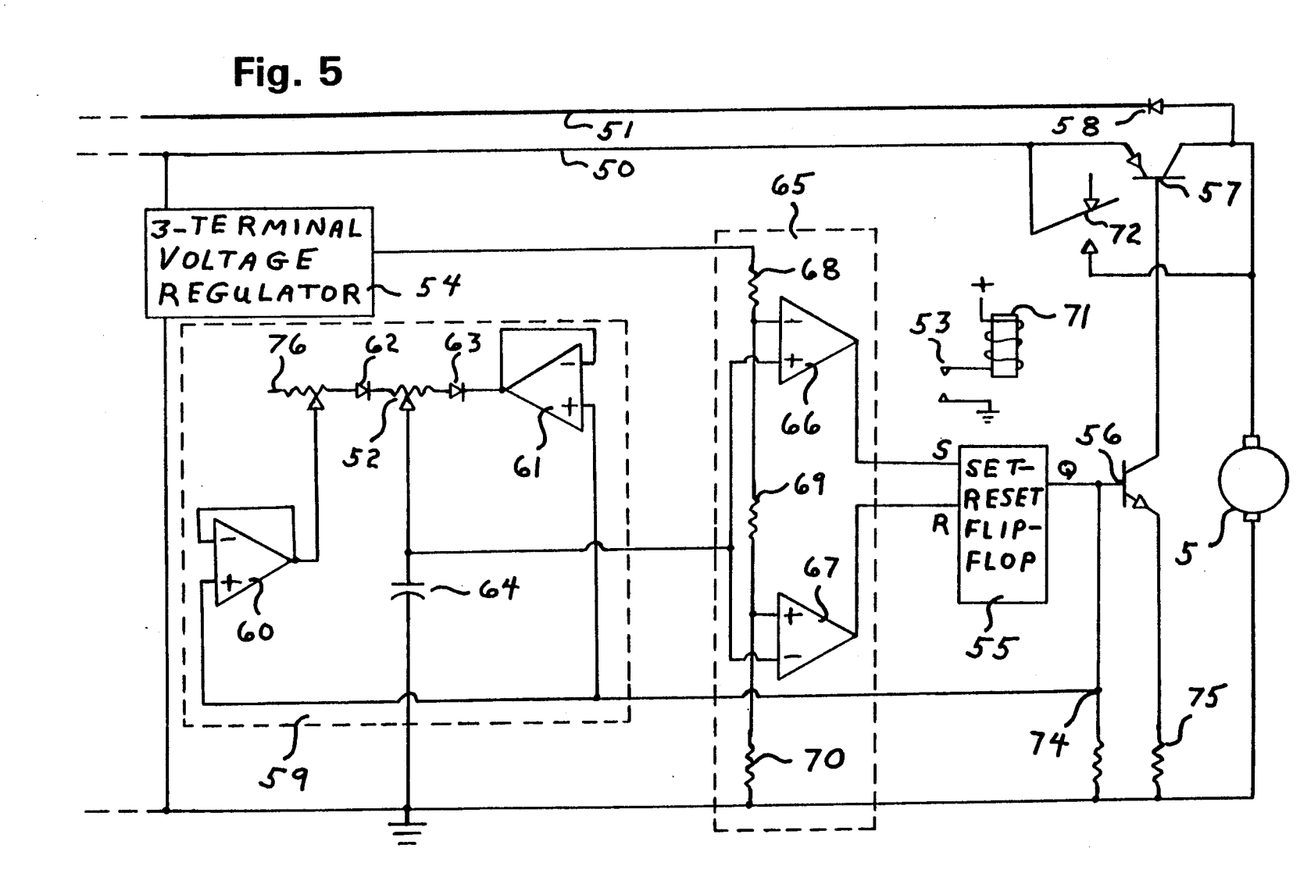
FIG. 5 is a simplified schematic diagram of the variable voltage circuit portion of the throttle means employed in the bicycle of FIG. 1. This circuit takes the raw drive voltage delivered by the battery switching circuit, and regulates it into an infinite range of lower voltage levels, as well as an equal voltage level, for delivery to the motor.

FIG. 5 is a simplified schematic diagram of the variable voltage circuit portion of the throttle means, which takes the 18-volt raw drive voltage delivered over conductor 50 from the battery switching circuit, and reduces it to a continuum of lower voltage levels for delivery to motor 5, ending with the full 18-volts.

Voltage levels less than 18-volts are achieved by rapidly connecting and then disconnecting the 18-volt raw drive voltage to motor 5. Transistors operate most efficiently in either the full ON or fully OFF state, and high efficiency is thus achieved. For example, if the 18-volt raw drive voltage is connected to motor 5 half the time over the duration of a second (50% duty cycle), 9 volts would be effectively coupled. The inductance present in the windings of motor 5 tends to smooth voltage fluctuations, as does the relatively high cycling rate.

Functional areas which comprise this variable voltage circuit are: 1) Three terminal voltage regulator 54, 2) R-S flip flop 55, 3) Sawtooth voltage waveform generator 59, 4) "Window" comparator 65, and 5) Power relay 71.

Three terminal voltage regulator 54 is of the 12-volt type widely available through electronic part retailers. Three terminal voltage regulator 54 takes the 18-volt raw drive voltage and reduces it to a regulated 12-volts for use by the delicate circuitry (but not motor 5).

R-S flip flop 55 essentially acts as a switch. The Q output of R-S flip flop 55 is driven by its R and S inputs as defined by the "truth" table which follows. When the Q output is high, driver transistor 56 enables pass transistor 57 to connect the 18-volt raw drive voltage to motor 5. When its Q output is low, pass transistor raw drive voltage is disconnected from motor 5. Diode 58 decouples pass transistor 57 is disabled and the 18-volt 57 from voltage spikes, and allows charging current to flow during regenerative braking. Resistor 75 serves to limit current through driver transistor 56.

| R | S | Q |
|---|---|---|
| low | low | no change |
| low | high | high |
| high | low | low |

Sawtooth voltage waveform generator 59 and window comparator 65 form a control loop between the R and S inputs and the Q output of R-S flip flop 55 to establish duty cycle and cycling rate.

For sawtooth voltage waveform generator 59, the present state of the Q output is sensed and delivered to the +(positive) inputs of operational amplifiers 60 and 61, which are configured as unity gain voltage followers. A high Q output drives the outputs of unity gain voltage followers 60 and 61 high, and since diode 62 is oriented to conduct current in the resultant polarity while diode 63 is not, unity gain voltage follower 60 begins to charge timing capacitor 64 through potentiometer 52, while unity gain voltage follower 61 remains idle. Here a relatively low path resistance (as adjusted by the wiper of potentiometer 52) results in a relatively fast charge time of timing capacitor 64, while a relatively high resistance results in a relatively slow charge time of capacitor 64.

When the Q output of flip flop 55 is low, a low voltage level is routed to unity gain voltage followers 60 and 61. Both outputs are driven low, but since diode 63 is oriented to conduct current in the resultant polarity while diode 62 is not, unity gain voltage follower 61 begins to discharge timing capacitor 64 through potentiometer 52, while unity gain voltage follower 60 remains idle. Here a relatively low path resistance (as adjusted by the wiper of potentiometer 52) results in a relatively fast discharge time of capacitor 64, while a relatively high resistance results in a relatively slow discharge time of capacitor 64.

The sum of the charge time and the discharge time of capacitor 64 essentially remains a constant regardless of the wiper setting of potentiometer 52. As charge time increases, discharge time correspondingly decreases. The rising and falling voltage levels across timing capacitor 64 constitute the sawtooth voltage waveform.

Next in the control loop, window comparator 65 takes the sawtooth voltage waveform generated across timing capacitor 64 and generates the R and S logic levels to toggle the Q output of R-S flip flop 55 between high and low. Resistors 68, 69, and 70 form a voltage divider which proportions the regulated 12-volts provided by three terminal voltage regulator 54 according to resistance values. Resistance values are selected such that the reference voltage at the upper end of resistor 69 is a constant 8 volts (with respect to ground), while the reference voltage at the lower end of resistor 69 is a constant 4 volts. Many reference voltages are possible, though the chosen are a workable combination.

Operational amplifier 66 is configured as a noninverting comparator with its 31 (minus) input connected to the upper end of resistor 69, and thus referenced to a steady 8 volts, and its output is routed to the S input of R-S Rip flop 55. Operational amplifier 67 is configured as an inverting comparator, with its +input connected to the lower end of resistor 69 and thus referenced to a steady 4 volts, and its output routed to the R input of R-S flip flop 55.

The voltage level across timing capacitor 64 is sensed and delivered to the +and −inputs of operational amplifiers 66 and 67 (respectively). First starting with a high Q output of R-S flip flop 55, the outputs of comparators 66 and 67 are both low as the voltage level across timing capacitor 64 steadily rises. As this voltage level rises above 8 volts, the output of comparator 66 shifts to high. The logic combination thus exists at the R and S inputs of R-S flip flop 55 to toggle its Q output to low. The output of comparator 66 shifts to low once again as the now falling voltage level coupled to its +input from timing capacitor 64 falls below 8 volts.

As the now falling voltage across timing capacitor 64 decreases below 4 volts, the output of comparator 67 shifts to high. The logic combination thus exists at the R and S inputs of R-S flip flop 55 to toggle its Q output to high. The output of comparator 67 shifts to low once again as the now rising voltage coupled to its - input from timing capacitor 64 rises above 4 volts. The cycle repeats, with cycling rate mainly set by the end-to-end resistance value of potentiometer 52 and the capacitance value of timing capacitor 64.

As the operator opens throttle mechanism 37 to maximum, relay contact 53 is grounded and relay 71 is thus activated. As relay 71 changes state, its center tap 72 causes pass transistor 57 to be bypassed and the 18 volt raw drive voltage on conductor 50 to be directly coupled with motor 5, for full power and an efficiency of essentially 100 percent.

I claim:
1. A multi-wheeled vehicle comprising:
   a vehicle frame;
   front and rear wheels coupled to the vehicle frame;
   motor means for supplying power for driving the vehicle;
   throttle means, coupled to the motor means, for variably regulating power supplied by the motor means;
   a continuously variable automatic transmission coupled to the motor means, said continuously variable automatic transmission being operative for frictionally applying driving power from the motor means to at least one of said rear wheels under a variable ratio corresponding to a load applied, said continuously variable ratio corresponding to a load applied, said continuously variable automatic transmission comprising a drive shaft, a drive cone, a transmission frame, a swing axle, and drive cone positioning means;
   said drive shaft being positioned parallel to an axle of said at least one of said rear wheels being driven;
   said drive cone having a larger diameter at one end thereof and a smaller diameter at an opposite end thereof and being mounted coaxially on and driven by said drive shaft to thereby permit said drive cone to move longitudinally along said drive shaft;
   said transmission frame supporting said drive shaft and said drive cone;
   said swing axle being mounted to said vehicle frame and to said transmission frame and being positioned parallel to the axle of said at least one of said rear wheels being driven, thereby permitting said transmission frame to swing into a drive position such that an outer surface of the drive cone remains in constant frictional contact with said at least one of said rear wheels being driven, independent of the position of said drive cone longitudinally along said drive shaft;
   said drive cone positioning means being operative to urge said drive cone longitudinally along said shaft to thereby select a drive cone ratio, said drive cone positioning means comprising a spring coaxially positioned on said drive shaft in contact with said drive cone for urging said drive cone into a position along said drive shaft representative of a state of equilibrium between a force produced by said spring and a force produced by said motor means.

2. A multi-wheeled vehicle as in claim 1 wherein said motor means comprises electric motor means, said multi-wheeled vehicle further comprising:

battery means, coupled to the electric motor means, for supplying operating power to the electric motor means; and braking means, coupled to said continuously variable automatic transmission, for urging said drive cone into frictional contact with said at least one of said rear wheels being driven to thereby drive the electric motor and generate a charging current to said battery means during braking, said braking means being further operative for positioning said drive cone along said drive shaft to effect a higher drive ratio during braking.

3. A multi-wheeled vehicle as in claim 1 wherein said motor means comprises electric motor means, said multi-wheeled vehicle further comprising:

battery means, coupled to the electric motor means, for supplying operating power to the electric motor means; and solar charging means, coupled to the battery means, the solar charging means including a plurality of solar cells mounted to at least one of the front and rear wheels for rotational motion in concert therewith, the solar charging means being operative for applying a solar charging current to the battery means.

4. A multi-wheeled vehicle as in claim 2 wherein said multi-wheeled vehicle further comprises solar charging means, coupled to the battery means, the solar charging means including a plurality of solar cells mounted to at least one of the front and rear wheels for rotational motion in concert therewith, the solar charging means being operative for applying a solar charging current to the battery means.

5. A multi-wheeled vehicle as in claim 3 further comprising a circular disc mounted to said at least one of the front and rear wheels to which said solar charging means is mounted, said plurality of solar cells being mounted to said circular disc.

6. A multi-wheeled vehicle as in claim 4 further comprising a circular disc mounted to said at least one of the front and rear wheels to which said solar charging means is mounted, said plurality of solar cells being mounted to said circular disc.

7. A multi-wheeled vehicle as in claim 1 wherein said motor means comprises electric motor means, said multi-wheeled vehicle further comprising:

battery means, comprising a plurality of batteries, coupled to the electric motor means, for supplying operating power to the electric motor means;

said throttle means including a battery switching circuit and a variable voltage circuit and being operative for variably applying a voltage supplied by the battery means to the electric motor means, said battery switching circuit being connected to the battery means and to the variable voltage circuit, said throttle means being operative for switching said plurality of batteries into an electrically parallel configuration to provide a lower terminal voltage of said battery means for facilitating the flow of a charging current from the electric motor means to the battery means, said throttle means being further operative for switching said plurality of batteries into an electrically series configuration to provide a higher terminal voltage of said battery means for application of a higher raw drive voltage to said variable voltage circuit;

said variable voltage circuit and said battery switching circuit being operative for regulating said raw drive voltage provided by said battery means for application to said electric motor means.

* * * * *